No. 773,131. PATENTED OCT. 25, 1904.
C. H. EICHMIEIER & H. AURAND.
SICKLE HOLDER.
APPLICATION FILED JAN. 27, 1904.
NO MODEL. 2 SHEETS—SHEET 1.
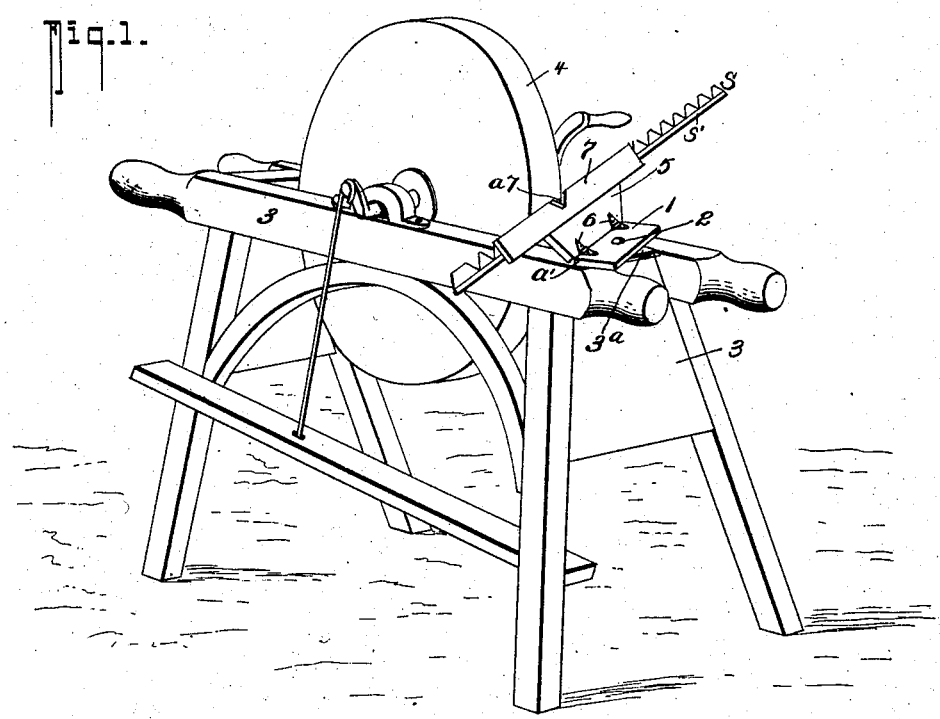
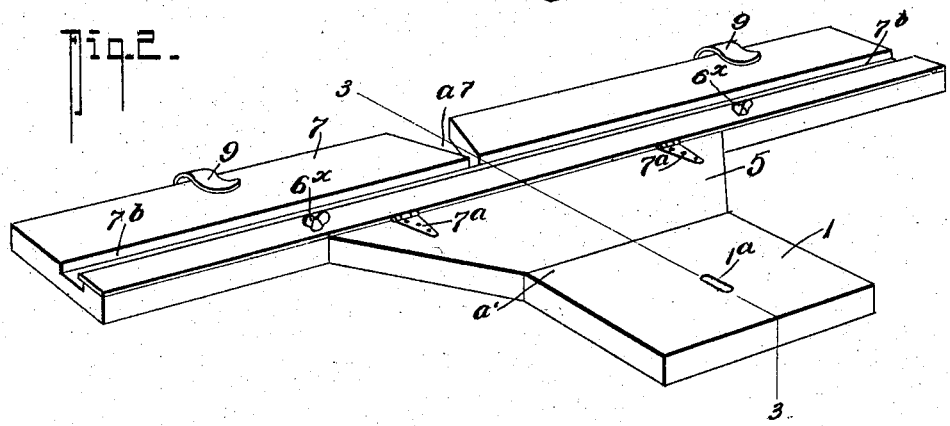
WITNESSES:
F. C. Gibson.
John T. Schmidt.
INVENTORS
C. H. Eichmieier.
Henry Aurand.
BY
Fred G. Dieterich & Co.
ATTORNEYS No. 773,131. PATENTED OCT. 25, 1904.
C. H. EICHMIEIER & H. AURAND.
SICKLE HOLDER.
APPLICATION FILED JAN. 27, 1904.
NO MODEL. 2 SHEETS—SHEET 2.

WITNESSES:
F. C. Gibson
John T. Schrott

INVENTORS
C. H. Eichmieier
Henry Aurand
BY
Fred G. Dieterich & Co.
ATTORNEYS

No. 773,131. Patented October 25, 1904.

UNITED STATES PATENT OFFICE.

CONRAD H. EICHMIEIER AND HENRY AURAND, OF PEARL CITY, ILLINOIS.

SICKLE-HOLDER.

SPECIFICATION forming part of Letters Patent No. 773,131, dated October 25, 1904.

Application filed January 27, 1904. Serial No. 190,911. (No model.)

*To all whom it may concern:*

Be it known that we, CONRAD H. EICHMIEIER and HENRY AURAND, residing at Pearl City, in the county of Stephenson and State of Illinois, have invented a new and Improved Sickle-Holder, of which the following is a specification.

Our invention seeks to provide a simple, economical, and easily-manipulated appliance for a handy holding of the sickle or cutter-bar and the grinding-stone during the operation of sharpening the cutter or sickle sections; and the same generically comprehends a member adapted to be adjustably connected to and fixedly held to its different adjustments upon the grinding-stone frame, a sickle-blade-supporting member upon which the sickle is longitudinally adjustable, and means for adjustably connecting the said supporting member with the portion that is adapted to be fixedly held on the grinding-stone frame, and whereby the sickle blade or bar may be quickly and positively adjusted with respect to the grinding-stone in such manner as to insure a proper and uniform bevel-grinding of every sickle-section and also in a manner that the operator can readily see when the knives have been ground to the edge desired.

Our invention also seeks to provide an improved construction of sickle-holder which is so designed that it can be readily operated by any man or boy, which is easily adjustable and adapted to work on old or new and short or long sickle-sections.

In its more subordinate features our invention consists in certain details of construction and novel arrangement of parts, all of which will be hereinafter described and claimed, and illustrated in the accompanying drawings, in which—

Figure 3:
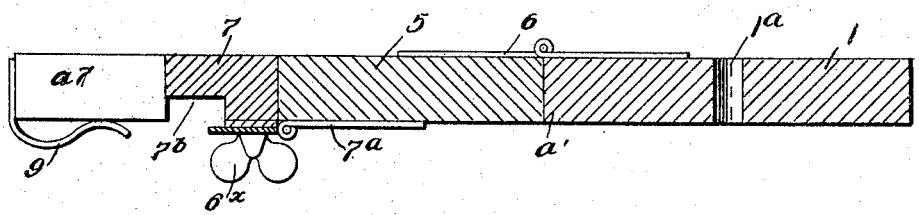
Figure 4:
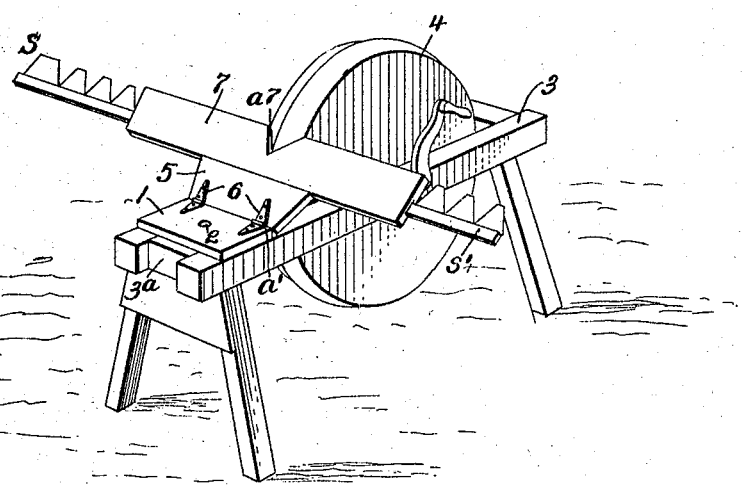
Figure 5:
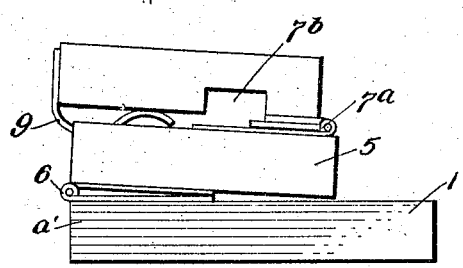

Figure 1 is a perspective view of a grinding-stone with our sickle-holder applied for use. Fig. 2 is a perspective view of the holder with the sickle-bar removed therefrom. Fig. 3 is a vertical section taken practically on the line 3 3 of Fig. 1. Fig. 4 is a perspective view showing our invention applied to a sickle-grinder having a bevel-stone. Fig. 5 is a view of the holder folded.

In the practical application our invention may be attached to an ordinary grinding-stone, as shown in Fig. 1, and the said invention comprises a base-piece 1, having an elongated bolt-hole $1^a$, adapted to receive a screw-stud 2, that projects up from the cross-head $3^a$ of the grinding-frame 3, whereby the said base-piece 1 can be readily moved to or from the axis of the grinding-stone 4, the shaft of which is provided with the usual crank-handle.

5 designates the bracket-piece, the inner end of which is hinged to the outer edge $a'$ of the base 1 by the strap-hinges 6 6, and to the outer edge of the said member 5 is hinged by strap-hinges $7^a$ a sickle-blade-supporting cross-bar 7, which is provided centrally thereof with a V-shaped notch $a^7$ of a size sufficient to leave one section of the sickle or cutter knife free to be engaged by the grinding-stone when our improvement is used on the ordinary type of grinding-stone, as shown in Fig. 1.

When our form of holder is to be used with the type of grinding-stone shown in Fig. 5, the central portion of the outer edge of the bar 7 is cut away sufficient to permit the proper grinding engagement of the stone with the sickle-sections.

To hold the sickle-blade S firmly to its set position upon the bar 7, the said bar 7 near its inner edge is formed with a groove $7^b$, that extends the full length of the bar and is of a depth sufficient to receive the binder or cleat piece $s'$ of the sickle, and to further properly hold the said sickle-blade to its set position upon the bar 7 set-screws $6^\times 6^\times$ are mounted on the said bar, adapted to engage with the rear edge of the sickle-blade, as shown, and flat springs 9, also connected to the bar 7, are provided that project over and onto the front edge of the sickle-blade, as shown.

From the foregoing description, taken in connection with the accompanying drawings, it is believed the manner in which our sickle-holder is used and its advantages will be readily apparent.

In using our invention it is only necessary to adjust the base-piece 1 upon the grinding-stone frame, so that the sickle can be swung down against the stone to get the desired bevel cut, after which the base 1 is made secure, and the blade-holder will then be adapted to bring the cutter-blade into engagement with the stone to effect a uniform bevel cut on all of its sections.

When used on grinders having a beveled stone, as shown in Fig. 4, the base 1 is secured to the base of the grinder, and the connecting-piece 2 is then swung to a horizontal position and the blade-holder bar to a vertical position with respect to the member 2 to provide for properly engaging the sickle-sections with the stone 10.

Having thus described our invention, what we claim, and desire to secure by Letters Patent, is—

As a new article of manufacture, a sickle-holder for grindstones, which comprises in combination, a base-piece having an elongated aperture, a bolt passing through said aperture to secure said base to the grindstone-frame, a sickle-supporting member disposed at right angles to the base-piece, said member having a groove in its face adjacent the inner edge, which extends the full length thereof and which is adapted to receive the reinforce or stay piece of the sickle, said sickle-supporting member also having a V-shaped recess in its outer edge centrally thereof, a cross-strip for projecting over the groove in the sickle-supporting member to hold the sickle on the said sickle-supporting member, a screw and winged-nut connection between said sickle-supporting member and said strip for holding said strip on said sickle-supporting member to clamp the sickle against the sickle-supporting member, flat springs mounted on the sickle-supporting member to clamp against the front edge of the sickle, a bracket-piece connecting the base-piece and the sickle-holding member, said bracket-piece being hinged at one edge in one end to the corresponding edge of the base-piece and being hinged at the opposite edge of the opposite end to the sickle-holding member so that the sickle-holding member, the bracket-piece and the base-piece may be folded up upon each other, substantially as shown and described.

CONRAD H. EICHMIEIER.
HENRY AURAND.

Witnesses:
J. F. MISHLER,
J. F. MISHLER.